United States Patent [19]
Butler et al.

[11] Patent Number: 5,727,882
[45] Date of Patent: Mar. 17, 1998

[54] PIVOT BEARING ASSEMBLY PROVIDING DAMPING FOR UNIT-TO-UNIT CONSISTENCY

[75] Inventors: Walter Wayne Butler, Felton; John Robert Edwards, Mountain View, both of Calif.

[73] Assignee: Western Digital Corporation, Irvine, Calif.

[21] Appl. No.: 826,204

[22] Filed: Mar. 27, 1997

[51] Int. Cl.⁶ .................................................. F16C 19/10
[52] U.S. Cl. .................................... 384/611; 384/536
[58] Field of Search .......................... 384/611, 536, 384/620, 582, 220, 222

[56] References Cited

U.S. PATENT DOCUMENTS

| 3,730,357 | 5/1973 | Beaty, Jr. et al. | 214/6 |
| 3,801,171 | 4/1974 | Rozentals | 384/536 |
| 4,594,772 | 6/1986 | Bucher | 29/603 |
| 5,029,029 | 7/1991 | Hatchett et al. | 360/106 |
| 5,048,980 | 9/1991 | Dickinson | 384/536 |
| 5,146,122 | 9/1992 | Hearn et al. | 310/13 |
| 5,286,118 | 2/1994 | Chi | 384/536 |
| 5,491,598 | 2/1996 | Stricklin et al. | 360/106 |

Primary Examiner—Lenard A. Footland
Attorney, Agent, or Firm—Leo J. Young; W. Chris Kim; Milad G. Shara

[57] ABSTRACT

A pivot bearing assembly for mounting to an enclosure of a head disk assembly to support a head stack assembly of a disk drive is disclosed. The pivot bearing assembly comprises a shaft for being affixed to the enclosure and defining a longitudinal axis, a first and second set of bearings, the second set of bearings longitudinally spaced from the first set of bearings, and each set of bearings surrounding a respective portion of the shaft. The pivot bearing assembly also comprises an inner sleeve member and an outer sleeve member, both sleeve members surrounding the shaft. A pair of channels is located between the outer and inner sleeve members. Alternatively, the pair of channels is located between the shaft and the sets of bearings. The channels contain a cured cast-in-place material, preferably, an ultra violet cured polyurethane compound having a hardness between approximately 24 Shore A to 79 Shore A. The material provides damping of any vibratory wave propagating between an outer surface of the outer sleeve member and the shaft. Furthermore, a portion of the cured cast-in-place material defines an exterior surface of the pivot bearing assembly.

20 Claims, 3 Drawing Sheets

PIVOT BEARING ASSEMBLY PROVIDING DAMPING FOR UNIT-TO-UNIT CONSISTENCY

BACKGROUND OF THE INVENTION

1. Field of the Invention

This invention relates to hard disk drives. More specifically, it relates to a pivot bearing assembly for incorporation into a head disk assembly of such a disk drive.

2. Description of the Prior Art and Related Information

In a contemporary hard disk drive, a pivot bearing assembly provides for rotatably supporting a head stack assembly within a head disk assembly so that each transducer head incorporated within the head stack assembly can be swung into a desired position relative to a respective recording surface of a disk. The head stack assembly typically comprises an actuator body portion surrounding a bore opening, a voice coil motor portion, and a set of head gimbal assemblies each carrying at least one transducer head for reading and writing on such a recording surface. The actuator body portion of the head stack assembly is typically attached to the pivot bearing assembly by inserting the pivot bearing assembly into the bore of the actuator body portion.

A conventional pivot bearing assembly comprises a shaft that is fixed to the base of the enclosure for the head disk assembly. The conventional pivot bearing assembly also includes two sets of bearings, and an outer sleeve. Each set of bearings typically has an inner race, an outer race, and ball bearings between the inner and outer races. Typically, an inner surface of each inner race abuts a portion of an outer cylindrical surface of the shaft. Typically, an outer surface of each outer race abuts a portion of an inner cylindrical surface of the outer sleeve. As installed within the head disk assembly, the outer surface of the cylindrical sleeve abuts the interior cylindrical surface of the bore of the actuator body. As a result, the actuator body portion is able to rotate about the fixed shaft of the pivot bearing assembly.

A contemporary disk drive needs to meet exacting standards with respect to the speed with which data can be accessed. These exacting standards involve high speed seek operations during which the head stack assembly receives high torque for angular acceleration to depart from a starting track and ramp up to a high angular velocity, then receives high torque for angular deceleration to ramp down the angular velocity and bring the active transducer head to a stable position at a target track for track following.

During such high-speed seek operations, various structures involved in supporting the transducer heads can vibrate in a manner characterized by at least one resonant frequency. So long as the active transducer head is vibrating by a sufficient amount after the deceleration torque is removed, the drive cannot begin writing to or reading from the target track. Also, the vibrations propagate from the head stack assembly through the pivot bearing assembly and into a base plate and cover causing increased acoustical noise.

One source of such vibrations involves the ball bearings within the pivot bearing assembly. The ball bearings are characterized by a finite radial stiffness. The existence of such finite radial stiffness, and particularly the tolerances associated with it (both initial tolerances and variations resulting from wear of the bearings), pose problems in disk drive design.

U.S. Pat. No. 5,491,598 to Stricklin et al. (the '598 patent) discloses one prior art approach to addressing this problem. The '598 patent teaches a pivot bearing assembly that incorporates a so-called "tuned mass damper" designed to provide damping at a particular frequency determined by the amount of mass of a ring portion of the tuned mass damper and by the radial stiffness of a supporting material portion of the tuned mass damper. The '598 patent does not address the issue of tolerance on the frequency at which an adverse resonance occurs, either initially or after bearing wear occurs.

The assignee of this invention has developed disk drives that incorporate an invention disclosed and claimed in application Ser. No. 08/561,344, filed Nov. 21, 1995, and titled "Disk Drive Having Elastomeric Interface In Pivot Bearing Assembly" [Docket No. K35A0205], which is directed to the same problem.

FIG. 1 illustrates the prior art structure involved in the above-identified invention of the assignee. As shown in FIG. 1, O-rings 100 and 102 are compressed between portions of a pivot bearing assembly 110. A fixed shaft 104 has a cap portion 106 and an inner sleeve 108 disposed thereon. O-ring 100 is compressed between cap portion 106 and inner sleeve 108. Similarly, O-ring 102 is compressed between inner sleeve 102 and fixed shaft 104. However, the damping provided by the O rings is tolerance dependent and hence, is not consistent among a common lot of O rings. Therefore, when slight manufacturing differences exist among a common lot of O rings, the damping provided by the O rings changes since the O rings compress or stiffen as a function of the manufacturing differences. For example, the compression is greater when the opening where the O rings fit is smaller.

Thus, a need exists to provide unit-to-unit consistency to dampen resonant vibrations induced in operation of a hard disk drive.

SUMMARY OF THE INVENTION

This invention can be regarded as a pivot bearing assembly for mounting to an enclosure of a head disk assembly to support a head stack assembly of a disk drive. The pivot bearing assembly comprises a shaft for being affixed to the enclosure and defining a longitudinal axis, a first and second set of bearings, the second set of bearings longitudinally spaced from the first set of bearings, and each set of bearings surrounding a respective portion of the shaft. The pivot bearing assembly also comprises a sleeve means defining an inner sleeve means surface and an outer sleeve means surface. The inner sleeve means surface has longitudinally spaced-apart cylindrical portions abutting the first and second sets of bearings. The outer sleeve means surface is cylindrical to mate with a portion of the head stack assembly. The pivot bearing assembly also comprises means defining a pair of generally ring-shaped, longitudinally spaced-apart channels where cured cast-in-place material occupies each of the channels to provide damping of any vibratory wave propagating between the outer sleeve means surface and the shaft. Furthermore, a portion of the cured cast-in-place material defines an exterior surface of the pivot bearing assembly.

In an embodiment, each channel is located between the inner sleeve member and the outer sleeve member. In another embodiment, each set of bearings has an inner race surface abutting a respective portion of each channel and each inner surface of each channel abuts a respective portion of the shaft such that each channel is located between each respective set of bearings and the shaft.

DETAILED DESCRIPTION OF THE PREFERRED EMBODIMENTS

Figure 2:
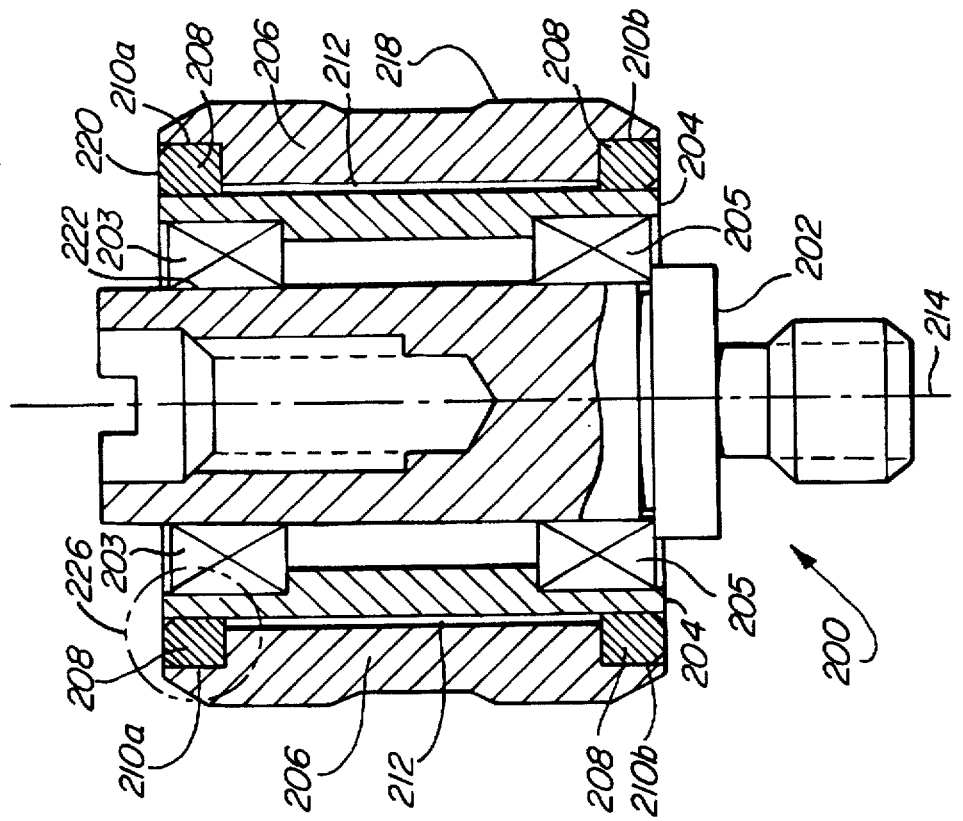
FIG. 2 is a cross sectional side view of a pivot bearing assembly in accordance with an embodiment of this invention.
Figure 1:
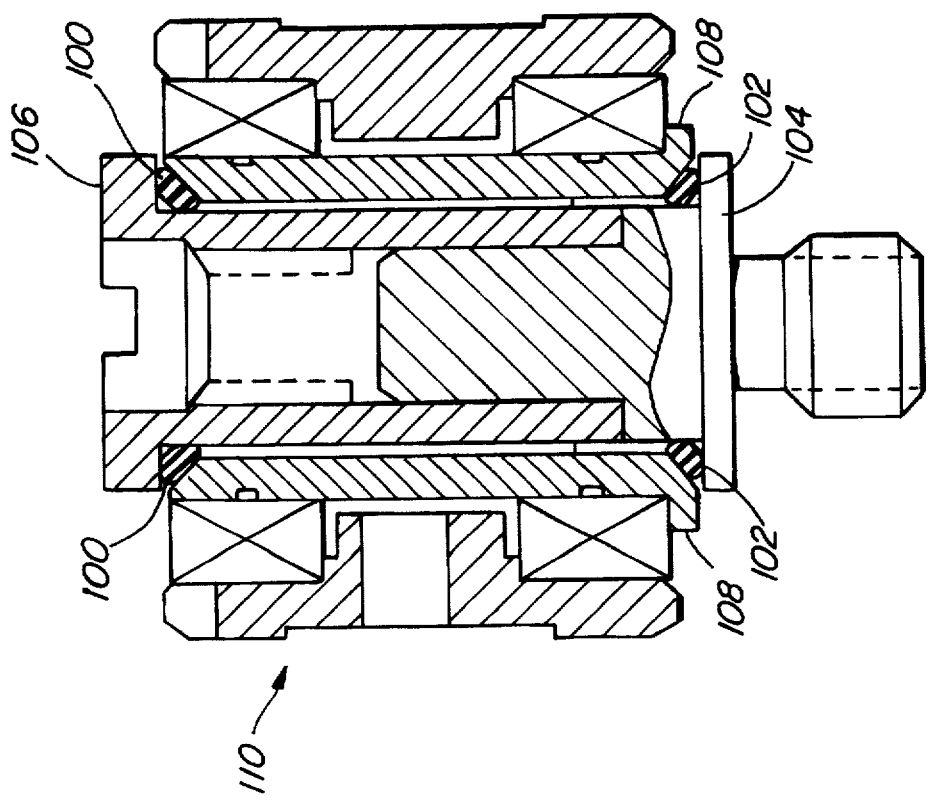
FIG. 1 is a cross-sectional side view of a prior art pivot bearing assembly including O-rings.

In FIG. 2, a pivot bearing assembly 200 includes a shaft 202 having a longitudinal axis 214, a first set of bearings 203, a second set of bearings 205, an inner sleeve member 204 and an outer sleeve member 206. It also includes a pair of generally ringed-shaped channels 210a and 210b located between inner sleeve member 204 and outer sleeve member 206. The term "ringed-shaped" refers to the shape of the channel when viewing the top of generally cylindrical shaped pivot bearing assembly 200. Channels 210a and 210b are formed by cutting into outer sleeve member 206. Alternatively, the channels can be formed by cutting into inner sleeve member 204. Channels 210a and 210b contain cured cast-in-place material 208, preferably an ultraviolet cured polyurethane compound which has a hardness approximately between 24 Shore A to 79 Shore A.

Material 208 damps any vibratory wave propagating between surface 218 of outer sleeve member 206 and shaft 202. An annular clearance region or air gap 212 extends longitudinally between channels 210a and 210bd and serves to separate inner 204 and outer 206 sleeve members. An inner race surface 222 of first 203 and second 205 sets of bearings abuts shaft 202. Each bearing set abuts a surface 216 of inner sleeve member 204, and a surface 218 of outer sleeve member 206 mates with a portion of a head stack assembly, see FIG. 5. A portion 220 of cured cast-in-place material 208 defines an exterior surface of pivot bearing assembly 200.

Still referring to FIG. 2, material 208 is a viscous gel-like material until it is exposed to ultraviolet light. It is cured by exposing material 208 to a high intensity ultraviolet light. After curing, material 208 becomes an elastic solid having a predetermined hardness, preferably approximately between 24 Shore A and 79 Shore A. Material 208 is available from Nippon Zeon Co., Ltd., of Tokyo, Japan. When material 208 cures, it adheres to both outer sleeve member 206 and inner sleeve member 204. Due to the elastic nature of cured material 208, outer sleeve member 206 is elastically bonded to inner sleeve member 204. Also, material 208 is generally too viscous to leak into clearance region 212, the dimensions of which are better shown in FIG. 3.

Pivot bearing assembly 200 can be tuned to damp vibrations that occur at specific resonant frequencies within a disk drive. The tuning is controlled by varying the size of channels 210a and 210b cut into outer sleeve member 206. Hence, the amount of material 208 which occupies channels 210a and 210b also varies. Alternatively, the tuning is controlled by varying the hardness of material 208 by choosing different polyurethane compounds having a different hardness.

Figure 3:
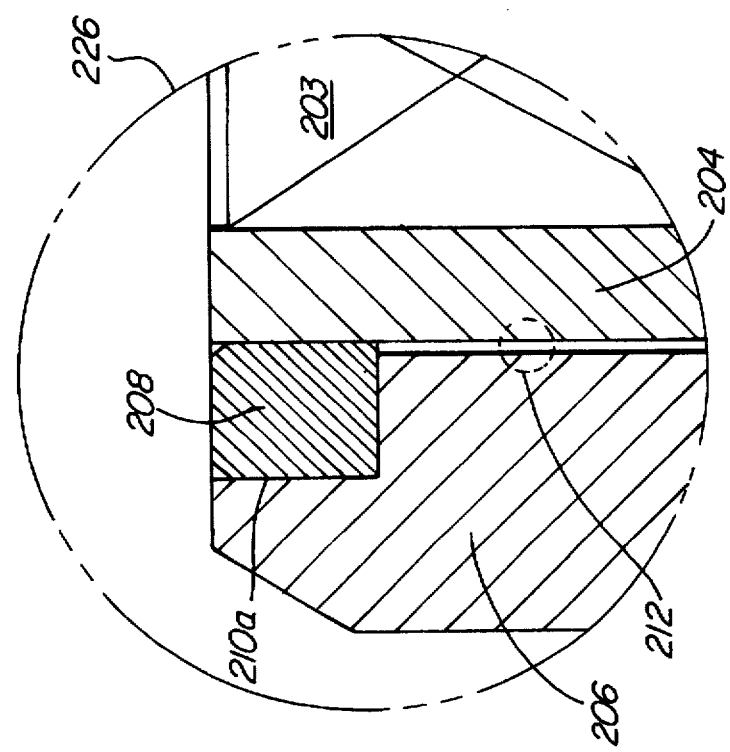
FIG. 3 is an enlarged view of the encircled portion of FIG. 2 which better reflects the relative dimensions of a clearance region 212 versus inner 204 and outer 206 sleeve members of a pivot bearing assembly shown in FIG. 2.

In FIG. 3, an enlarged portion 226 of FIG. 2 is shown. Clearance region 212 is very small (approximately 10 mils wide) compared to inner sleeve member 204, outer sleeve member 206, and channel 210a. Hence, material 208 generally does not leak into clearance region 212 due to its viscosity.

Figure 4:
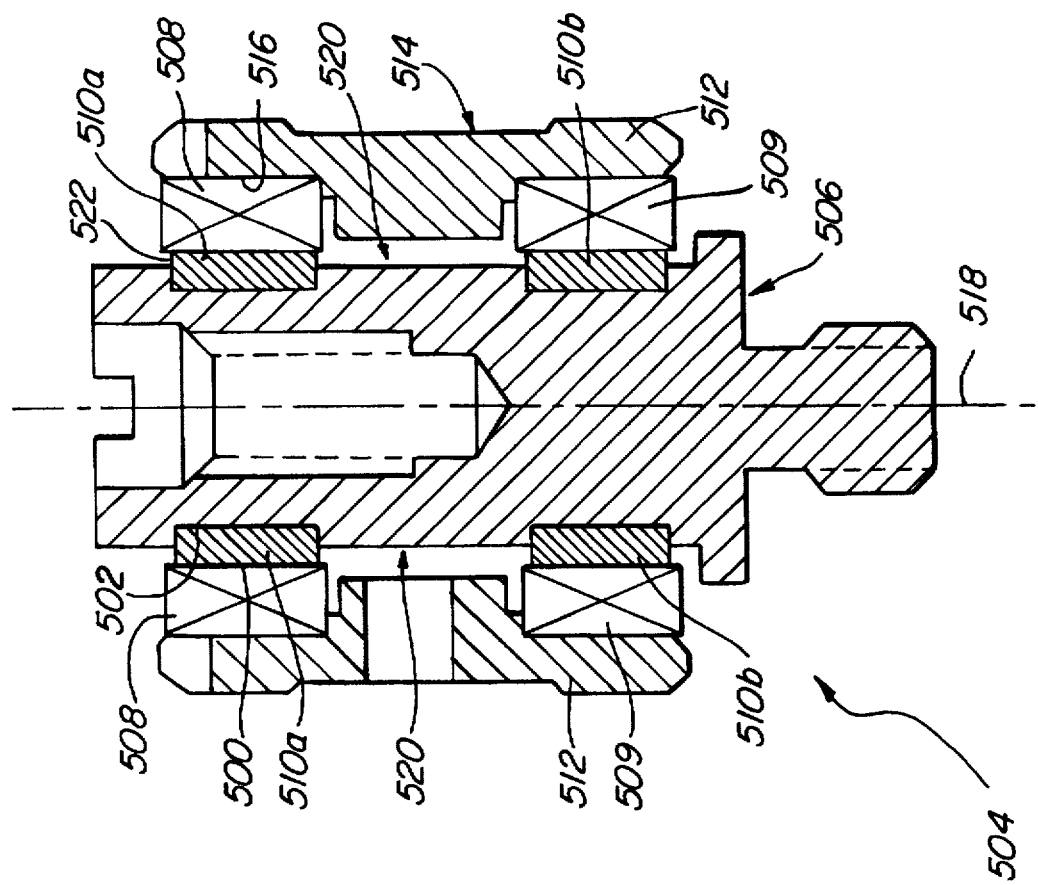
FIG. 4 is a cross sectional side view of a pivot bearing assembly in accordance with another embodiment of this invention.

In FIG. 4, pivot bearing assembly 504 includes a shaft 506 having a longitudinal axis 518, a pair of generally ring-shaped channels 510a and 510b, a first set of bearings 508, a second set of bearings 509, and a sleeve means including a sleeve member 512. Channels 510a and 510b are located between shaft 506 and a respective bearing set such that an inner race surface 500 of each bearing set abuts a respective portion of each channel, and an inner surface 502 of each channel abuts a respective portion of shaft 506. The same cast-in-place material 208 as shown in FIG. 2 is deposited into the channels and cured such that a portion 522 of the material defines an exterior surface of pivot bearing assembly 504. The cured material is then post processed, e.g., trimmed of excess material, to provide a desired shape. Pivot bearing assembly 504 is tuned in the same manner as pivot bearing assembly 200.

Figure 5:
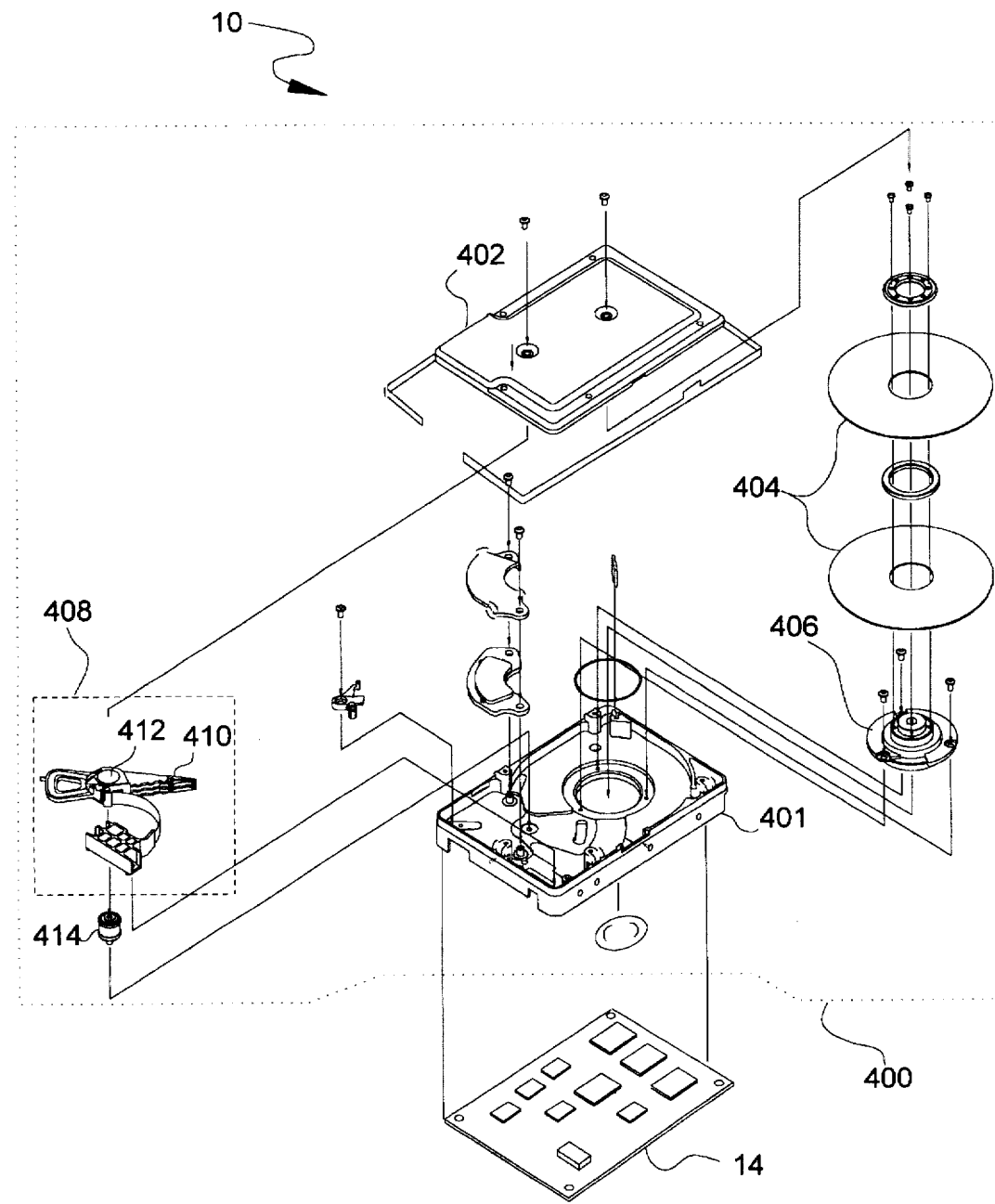
FIG. 5 is an exploded view of a disk drive which incorporates the various embodiments of this invention.

In FIG. 5, a disk drive 10 includes a head disk assembly 400 and a printed circuit board assembly 14. Head disk assembly 400 includes an enclosure having a base 401 and a cover 402. It also includes disks 404 mounted on a spindle motor 406, and a head stack assembly 408. Head stack assembly 408 includes a bore 412 and a plurality of actuator arms 410. A pivot bearing assembly 414 of this invention is affixed to base 401 and is fitted into bore 412 of head stack assembly 408. Cover 402 is affixed to pivot bearing assembly 414 to form the enclosure.

An advantage of this invention is that the damping of the resonant frequencies is not tolerance dependent. Hence, unit to unit consistency to dampen the resonant frequencies induced in a disk drive is achieved. Moreover, the pivot bearing assembly is tuned to damp specific resonant frequencies that characterize a particular line of disk drives.

We claim:

1. A pivot bearing assembly for mounting to an enclosure of a head disk assembly to support a head stack assembly of a disk drive, the pivot bearing assembly comprising:

a shaft for being affixed to the enclosure and defining a longitudinal axis;

a first set of bearings;

a second set of bearings longitudinally spaced from the first set of bearings;

each set of bearings surrounding a respective portion of the shaft;

sleeve means defining an inner sleeve means surface and an outer sleeve means surface;

the inner sleeve means surface having longitudinally spaced-apart cylindrical portions abutting the first and second sets of bearings;

the outer sleeve means surface being cylindrical to mate with a portion of the head stack assembly;

means defining a pair of generally ring-shaped, longitudinally spaced-apart channels; and cured cast-in-place material occupying each of the channels to provide damping of any vibratory wave propagating between the outer sleeve means surface and the shaft.

2. The pivot bearing assembly of claim 1, wherein each set of bearings has an inner race surface abutting a respective portion of the shaft.

3. The pivot bearing assembly of claim 2, wherein the sleeve means comprises an inner sleeve member and an outer sleeve member, and wherein each channel is located between the inner sleeve member and the outer sleeve member.

4. The pivot bearing assembly of claim 3, wherein the cured cast-in-place material comprises an ultra violet cured polyurethane compound.

5. The pivot bearing assembly of claim 4 wherein the cured cast-in-place material has a hardness in the range of 24 Shore A to 79 Shore A.

6. The pivot bearing assembly of claim 1, wherein the sleeve means comprises an outer sleeve member and an inner sleeve member, and wherein each channel is defined by oppositely facing surfaces of the inner and outer sleeve members.

7. The pivot bearing assembly of claim 6, wherein an annular clearance region extends longitudinally between the channels.

8. The pivot bearing assembly of claim 1, wherein each set of bearings has an inner race surface abutting a respective portion of each channel.

9. The pivot bearing assembly of claim 8, wherein the cured cast-in-place material comprises an ultra violet cured polyurethane compound.

10. The pivot bearing assembly of claim 9, wherein each inner surface of each channel abuts a respective portion of the shaft such that each channel is located between each respective set of bearings and the shaft.

11. A pivot bearing assembly for mounting to an enclosure of a head disk assembly to support a head stack assembly of a disk drive, the pivot bearing assembly comprising:

a shaft for being affixed to the enclosure and defining a longitudinal axis;

a first set of bearings;

a second set of bearings longitudinally spaced from the first set of bearings;

each set of bearings surrounding a respective portion of the shaft;

sleeve means defining an inner sleeve means surface and an outer sleeve means surface;

the inner sleeve means surface having longitudinally spaced-apart cylindrical portions abutting the first and second sets of bearings;

the outer sleeve means surface being cylindrical to mate with a portion of the head stack assembly;

means defining a pair of generally ring-shaped, longitudinally spaced-apart channels; and cured cast-in-place material occupying each of the channels to provide damping of any vibratory wave propagating between the outer sleeve means surface and the shaft, a portion of the cured cast-in-place material defining an exterior surface of the pivot bearing assembly.

12. The pivot bearing assembly of claim 11 wherein each set of bearings has an inner race surface abutting a respective portion of the shaft.

13. The pivot bearing assembly of claim 12, wherein the sleeve means comprises an inner sleeve member and an outer sleeve member, and wherein each channel is located between the inner sleeve member and the outer sleeve member.

14. The pivot bearing assembly of claim 13, wherein the cured cast-in-place material comprises an ultra violet cured polyurethane compound.

15. The pivot bearing assembly of claim 14 wherein the cured cast-in-place material has a hardness in the range of 24 Shore A to 79 Shore A.

16. The pivot bearing assembly of claim 11, wherein the sleeve means comprises an outer sleeve member and an inner sleeve member, and wherein each channel is defined by oppositely facing surfaces of the inner and outer sleeve members.

17. The pivot bearing assembly of claim 16, wherein an annular clearance region extends longitudinally between the channels.

18. The pivot bearing assembly of claim 11, wherein each set of bearings has an inner race surface abutting a respective portion of each channel.

19. The pivot bearing assembly of claim 18, wherein the cured cast-in-place material comprises an ultra violet cured polyurethane compound.

20. The pivot bearing assembly of claim 19, wherein each inner surface of each channel abuts a respective portion of the shaft such that each channel is located between each respective set of bearings and the shaft.

* * * * *